US008200995B2

(12) United States Patent
Shiga et al.

(10) Patent No.: US 8,200,995 B2
(45) Date of Patent: Jun. 12, 2012

(54) INFORMATION PROCESSING SYSTEM AND POWER-SAVE CONTROL METHOD FOR USE IN THE SYSTEM

(75) Inventors: Yoko Shiga, Yokohoma (JP); Keisuke Hatasaki, Kawasaki (JP); Yoshifumi Takamoto, Kokubunji (JP); Takeshi Kato, Akishima (JP); Tadakatsu Nakajima, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 12/388,710

(22) Filed: Feb. 19, 2009

(65) Prior Publication Data

US 2009/0327778 A1  Dec. 31, 2009

(30) Foreign Application Priority Data

Jun. 30, 2008 (JP) ................................. 2008-171761

(51) Int. Cl.
G06F 11/00 (2006.01)

(52) U.S. Cl. ........ 713/300; 713/310; 713/320; 713/321; 713/322; 713/324; 713/330; 713/340; 700/300; 361/695; 454/184

(58) Field of Classification Search .................. 713/300, 713/310, 320–324, 330, 340; 700/300; 361/695; 702/136; 454/184
See application file for complete search history.

(56) References Cited

U.S. PATENT DOCUMENTS

| 2003/0177406 | A1 | 9/2003 | Bradley |
| 2005/0235288 | A1 | 10/2005 | Yamakabe et al. |
| 2007/0180117 | A1 | 8/2007 | Matsumoto et al. |
| 2007/0260417 | A1* | 11/2007 | Starmer et al. ................ 702/136 |
| 2009/0046430 | A1* | 2/2009 | Brewer et al. ................ 361/701 |

FOREIGN PATENT DOCUMENTS

| JP | 2004-126968 | 4/2004 |
| JP | 2005531047 | 10/2005 |
| JP | 2005309644 | 11/2005 |
| JP | 2007179437 | 7/2007 |
| JP | 2007226587 | 9/2007 |
| WO | 03079171 | 9/2003 |

OTHER PUBLICATIONS

Japanese Office Action issued in corresponding Japanese Patent Application No. 2008-171761 on Oct. 18, 2011 w/partial English language translation.

* cited by examiner

Primary Examiner — M Elamin
(74) Attorney, Agent, or Firm — Brundidge & Stanger, P.C.

(57) ABSTRACT

A technique for determining task allocation for reducing power consumption of an entire system is disclosed. This system includes physical computers, a cooling apparatus for cooling the physical computers, and a power-saving control server for controlling the physical computers and cooling apparatus. The power-saving control server includes a virtual server layout generator which sets up a plurality of sets of task allocations with respect to the physical computers, a server power calculator for calculating power consumption of the physical computers in each task allocation, a physical computer profile used to estimate a heat release amount of the physical computers in each task allocation, a cooling power calculator which computes power consumption of the cooling apparatus, and a virtual server relocator which determines a task allocation with a total of calculated values of the server/cooling power calculators being minimized to be the optimum task allocation for the physical computers.

8 Claims, 10 Drawing Sheets

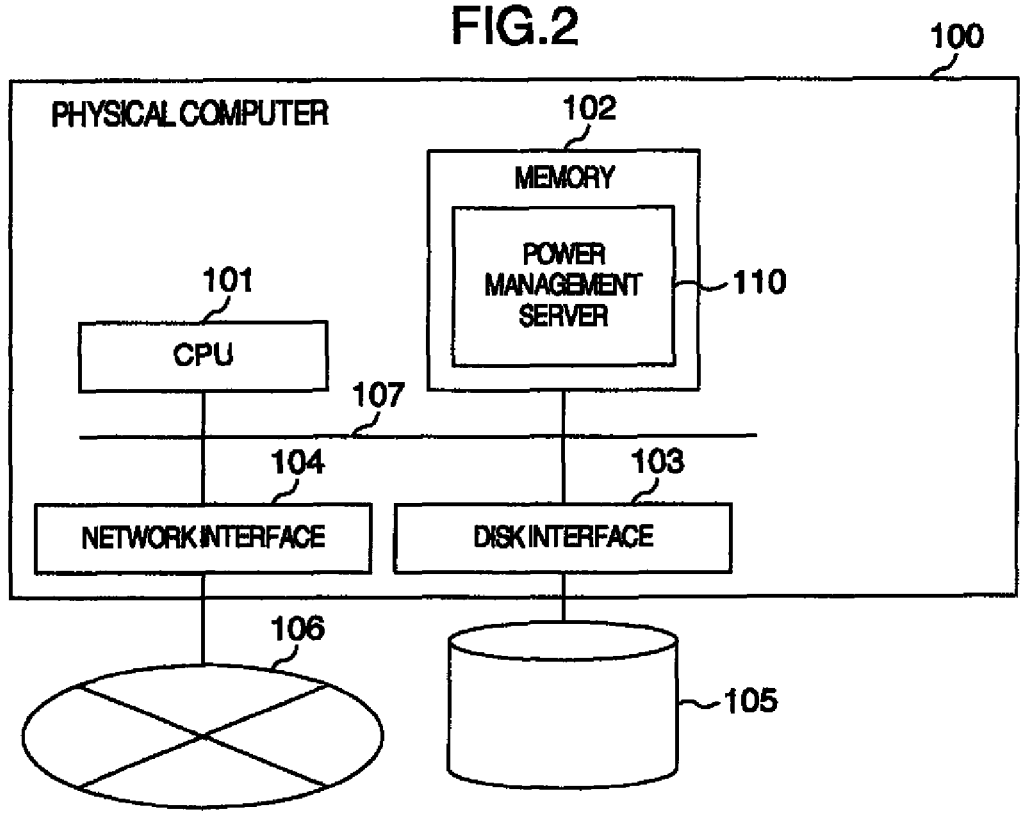
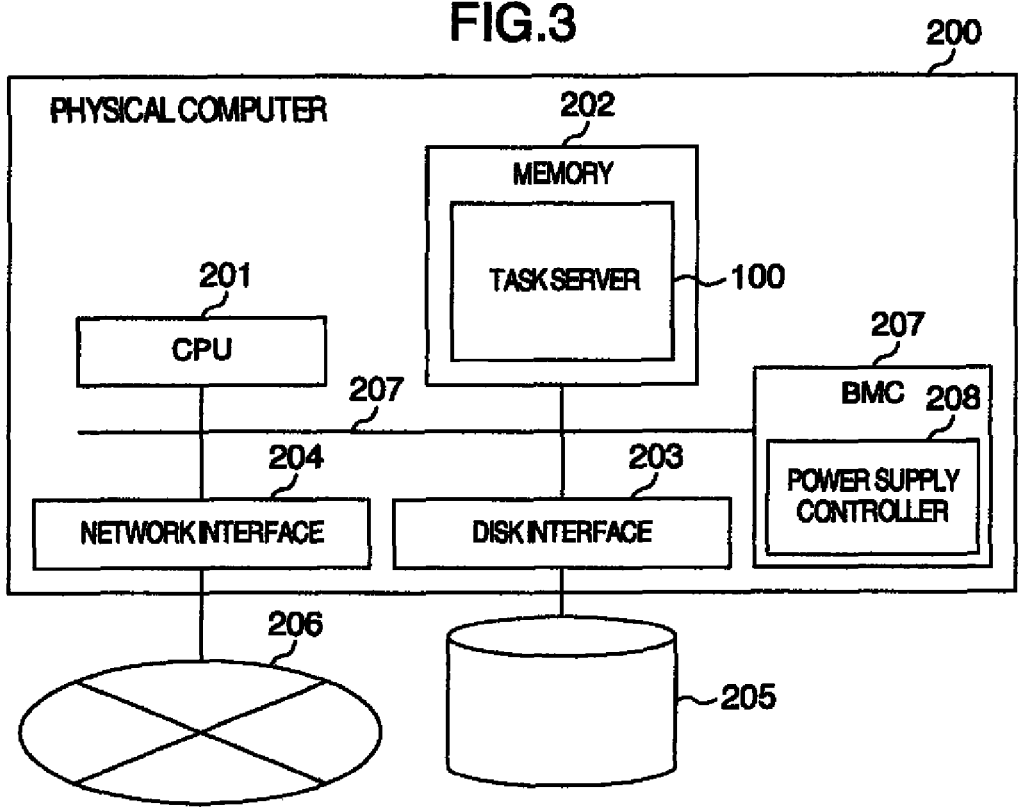

FIG.5

| PHYSICAL COMPUTER ID | CHASSIS # | ITEMS | VALUE |
|---|---|---|---|
| PHYSICAL SERVER 1 | 01 | CPU ID | 001 |
| | | OPERATION FREQ. | 3.0 |
| | | MEMORY CAPACITY | 4.0 |
| | | DISK I/F ID | 001 |
| | | BAND | 1000 |
| | | Network I/F ID | 001 |
| | | BAND | 1000 |
| PHYSICAL SERVER 2 | — | CPU ID | 001 |
| | | OPERATION FREQ. | 3.0 |
| | | MEMORY CAPACITY | 4.0 |
| | | DISK I/F ID | 001 |
| | | BAND | 1000 |
| | | Network I/F ID | 001 |
| | | BAND | 1000 |
| PHYSICAL SERVER 3 | | | |

| 611 | 612 | 613 | 614 | 610 |
|---|---|---|---|---|
| PHYSICAL COMPUTER ID | VIRTUALIZER TYPE | VIRTUAL COMPUTER ID | IP ADDRESS | |
| PHYSICAL SERVER 1 | A | VIRTUAL SERVER 1 | 10.1.2.3 | |
| | | VIRTUAL SERVER 2 | 10.1.2.4 | |
| | | VIRTUAL SERVER 3 | 10.1.2.5 | |
| PHYSICAL SERVER 2 | B | VIRTUAL SERVER 4 | 10.1.2.6 | |
| | | VIRTUAL SERVER 5 | 10.1.2.7 | |
| | | VIRTUAL SERVER 6 | 10.1.2.8 | |
| | | VIRTUAL SERVER 7 | 10.1.2.9 | |

| 621 | 622 | 623 | 624 | 620 |
|---|---|---|---|---|
| VIRTUAL COMPUTER ID | TASK KIND | ITEMS | VALUE | |
| VIRTUAL SERVER 1 | A | CPU ID | 001 | |
| | | OPERATION FREQ. | 3.0 | |
| | | MEMORY CAPACITY | 4.0 | |
| | | DISK I/F ID | 001 | |
| | | BAND | 1000 | |
| | | Network I/F ID | 001 | |
| | | BAND | 1000 | |
| VIRTUAL SERVER 2 | A | CPU ID | 001 | |
| | | OPERATION FREQ. | 3.0 | |
| | | MEMORY CAPACITY | 4.0 | |
| | | DISK I/F ID | 001 | |
| | | BAND | 1000 | |
| | | Network I/F ID | 001 | |
| | | BAND | 1000 | |
| VIRTUAL SERVER 4 | B | | | |

FIG.7A

| | 711 | 712 | 713 | 714 | 715 | 716 | 717 | 718 710 |
|---|---|---|---|---|---|---|---|---|
| | Date | Week | Time | CPU01 | CPU02 | memory | disk | network |
| | 2007/12/10 | mon | 12:00:00 | 20 | 23 | | | |
| | 2007/12/10 | mon | 12:10:00 | 15 | 15 | | | |
| | 2007/12/10 | mon | 12:20:00 | 20 | 21 | | | |
| | 2007/12/10 | mon | 12:30:00 | 22 | 21 | | | |
| | ... | ... | ... | ... | ... | ... | ... | ... |

FIG.7B

| | 721 | 722 | 723 | 724 | 725 | 726 720 |
|---|---|---|---|---|---|---|
| | Date | Week | Time | COMPUTER 1 | COMPUTER 2 | CHASSIS 1 |
| | 2007/12/10 | mon | 12:00:00 | | | |
| | 2007/12/10 | mon | 12:10:00 | | | |
| | 2007/12/10 | mon | 12:20:00 | | | |
| | 2007/12/10 | mon | 12:30:00 | | | |
| | ... | ... | ... | ... | ... | ... |

| WORKING RATE | HEAT GENERATED (kW) | POWER CONSUMED (kW) |
|---|---|---|
| 0 | | |
| 10 | | |
| 20 | | |
| 30 | | |
| 40 | | |
| 50 | | |
| 60 | | |
| 70 | | |
| 80 | | |
| 90 | | |
| 100 | | |

801　802　803

820

| TOTAL BLADE WORKING RATE | HEAT GENERATED (kW) | POWER CONSUMED (kW) |
|---|---|---|
| 0 | | |
| 10 | | |
| 20 | | |
| 30 | | |
| 40 | | |
| 50 | | |
| 60 | | |
| 70 | | |
| 80 | | |
| 90 | | |
| 100 | | |

| RACK | COOLER | DISTRIBUTION |
|---|---|---|
| 1 | A | 60/100 |
| 1 | B | 0/100 |
| 2 | A | 20/100 |
| 2 | B | 0/100 |
| 3 | A | 0/100 |
| 3 | B | 60/100 |
| 4 | A | 0/100 |
| 4 | B | 30/100 |

FIG.10

| AIR-CONDITIONING OUTPUT | COOLING AMOUNT (kW) | POWER CONSUMED (kW) |
|---|---|---|
| 1 | 5 | 1 |
| 2 | 10 | 2 |
| 3 | 15 | 3 |
| 4 | 20 | 4 |
| 5 | 25 | 5 |

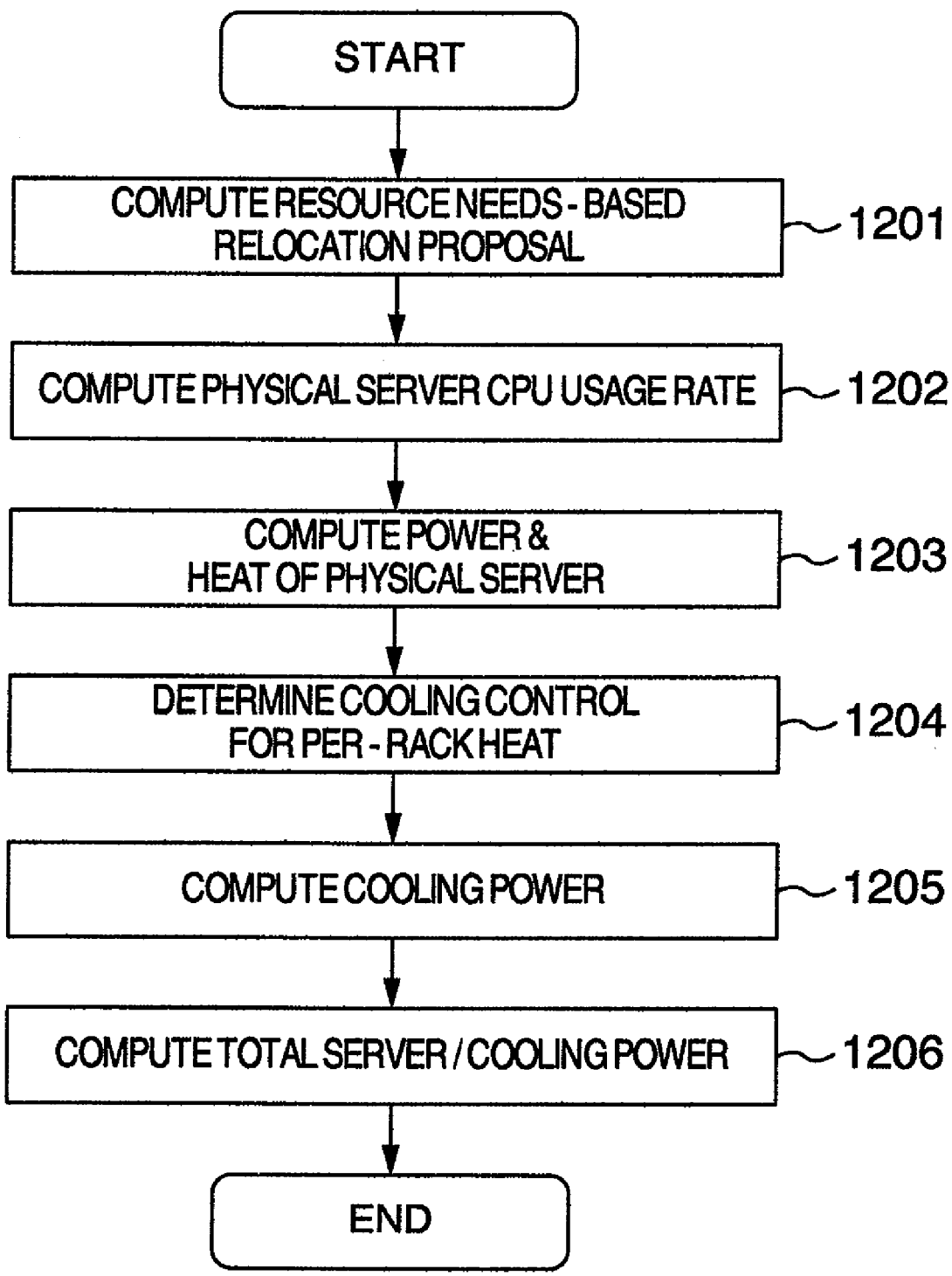

INFORMATION PROCESSING SYSTEM AND POWER-SAVE CONTROL METHOD FOR USE IN THE SYSTEM

INCORPORATION BY REFERENCE

The present application claims priority from Japanese application JP2008-171761 filed on Jun. 30, 2008, the content of which is hereby incorporated by reference into this application.

TECHNICAL FIELD

The present invention relates generally to an information processing system which is configured from a plurality of network-linked computers and network devices, and more particularly to a technique for reducing electrical power consumption in this system.

BACKGROUND OF THE INVENTION

The quest for higher processor performance and the advent of high-density information technology (IT) equipment, such as blade servers, have posed a critical problem as to increases in power consumption of IT systems. As a solution to this problem, the development of power consumption reduction technologies is advanced, such as low power consumption processors and high efficiency cooling methods. Unfortunately, per-apparatus power-saving techniques have limits. Thus, in order to obtain more significant power-saving effects, a need is felt to make efforts for achieving an adequate approach on the system level.

Especially, in view of the fact that servers consume a certain amount of electric power due to the flow of a leakage current therein even when these are set to zero (0) in working rate thereof, a system condition with the use of a great number of servers of low working rates is inferior in efficiency in terms of the electric power. Thus, it is expected to achieve power-saved system operation/management which uses a minimal number of servers at the highest possible operation rate while forcing the power supply of an unused server(s) to turn off. In contrast, a virtualized server is movable or transferable to another physical server; so, when a certain kind of business task decreases in load, virtual servers which are being executed by a low operation-rate server are gathered together for concentrative aggregation in such a way as to reduce the number of presently operating physical servers, thereby making it possible to save power to be consumed by an entire system. As such virtual servers become widely used in practical applications, the above-stated power-saved system operation/management is becoming reality.

However, when an attempt is made to operate only a few number of servers in a heavily-loaded state while letting the others be shut down, the surrounding area of each such active server becomes a heat accumulation space of high temperatures-say, hot spot. When an entire cooling output is increased in order to cool down spatially scattered hot spots, electric power needed for this cooling operation can excessively increase beyond an acceptable level. In this respect, a method for determining a to-be-activated server by taking into consideration a heat distribution is disclosed in US2003/0177406A1. A method of optimizing a server configuration by taking account of the cooling ability or "coolability" of a built-in cooling apparatus of a server is disclosed in JP-A-2004-126968.

SUMMARY OF THE INVENTION

In near future, it is likely that a cooling apparatus capable of performing per-area or "local" temperature control will become more important, rather than standard techniques for uniformly cooling an entire machine room by use of a large-scale massive cooling apparatus. Examples of it are a directional cooling machine and a per-rack cooling device attachable to the back face of a rack, which have already been commercially available in the market.

While the cooling apparatus is currently designed in most cases to cool or refrigerate a predetermined range of room space by determining its output based on a detection result of a stationary temperature sensor, it is considered that the sensor connected to cooling apparatus and the air-blowing direction will become modifiable in such a way as to intensively cool down one-side position-offset servers (groups) by a plurality of cooling machines. For instance, in the case of a facility which performs cooling operations using cold air or "wind" from a space under the floor, it is believed that open/close drive of the floor's grating plates (hole-formed tiles) is controlled to change the underfloor air-blowing portions to thereby cool the offset servers in a focused way.

With this type of cooling apparatus, in cases where loads are locally gathered for concentration to one or some of the servers (groups), it is possible to aggregate the coolability also.

Note however that in practical implementation, it is never permissible that such the power save-aimed load aggregation work results in an undesired increase in power consumption. It is also unacceptable that the lack of the ability to cool the offset servers (groups) leads to generation of thermal runaway. For this reason, an appropriate action should be taken to pre-estimate, prior to execution of the aggregation of servers and coolability, whether there is the coolability high enough to cool such aggregated part when gathering loads together to a given server (group) and also preestimate whether the power consumption of an entire system including IT equipment and cooling machines is reducible or not.

In order to realize such the estimation, it is needed to determine a cooling machine capable of cooling down a group of aggregated servers and then investigate its coolability and electrical power required for cool-down in the case of the concentrative aggregation.

Unfortunately, the presently available cooling facility is merely controlled based on a temperature to be detected by a sensor connected thereto and thus fails to manage the relationship with a target server to be managed, i.e., management object server. This makes it impossible to estimate whether the coolability is sufficient or not and how much electric power is needed for the intended cooling operation.

It is therefore an object of this invention to provide an information processing system capable of determining a task allocation for reduction of electric power consumption of the entire system as the task layout with respect to a plurality of servers under management, each of which gives access to a storage device during cool-down or refrigeration by a cooling apparatus associated therewith.

To attain the foregoing object, this invention provides an information processing system having a power-saving controller. This controller operates, upon determination of the task allocation with respect to the plurality of managed servers each giving access to the storage device while being cooled by cooling machines, to detect workload of the plurality of managed servers and control the cooling apparatus and servers in accordance with this detection result. One principal feature lies in that the power-saving controller controls the individual one of the cooling machines in a way pursuant to the workload of the servers to thereby control a cooling distribution thereof and, at the same time, controls the task allocation with respect to the servers.

According to this invention, it is possible to provide the information processing system capable of determining a task allocation for reduction of power consumption of the entire system as the task allocation with respect to the managed servers.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing a hardware arrangement of a power-saving control server of one embodiment of this invention.

FIG. 3 is a diagram showing a hardware structure of a physical computer of management object in accordance with one embodiment of the invention.

FIG. 5 is a diagram showing, in table form, a data structure of physical server configuration information in accordance with one embodiment of this invention.

FIG. 6 is a diagram showing in table form virtual server configuration information in accordance with one embodiment of this invention.

FIGS. 7A and 7B are diagrams showing operational information and power consumption information in one embodiment of this invention.

FIG. 8 is a diagram showing a server profile in one embodiment of the invention.

FIG. 9 is a diagram showing a server/cooling map in one embodiment of this invention.

FIG. 10 is a diagram showing a cooling facility profile in one embodiment of this invention.

FIG. 12 is a flowchart of a relocation proposal search procedure in one embodiment of the invention.

DESCRIPTION OF THE EMBODIMENT

Figure 1:
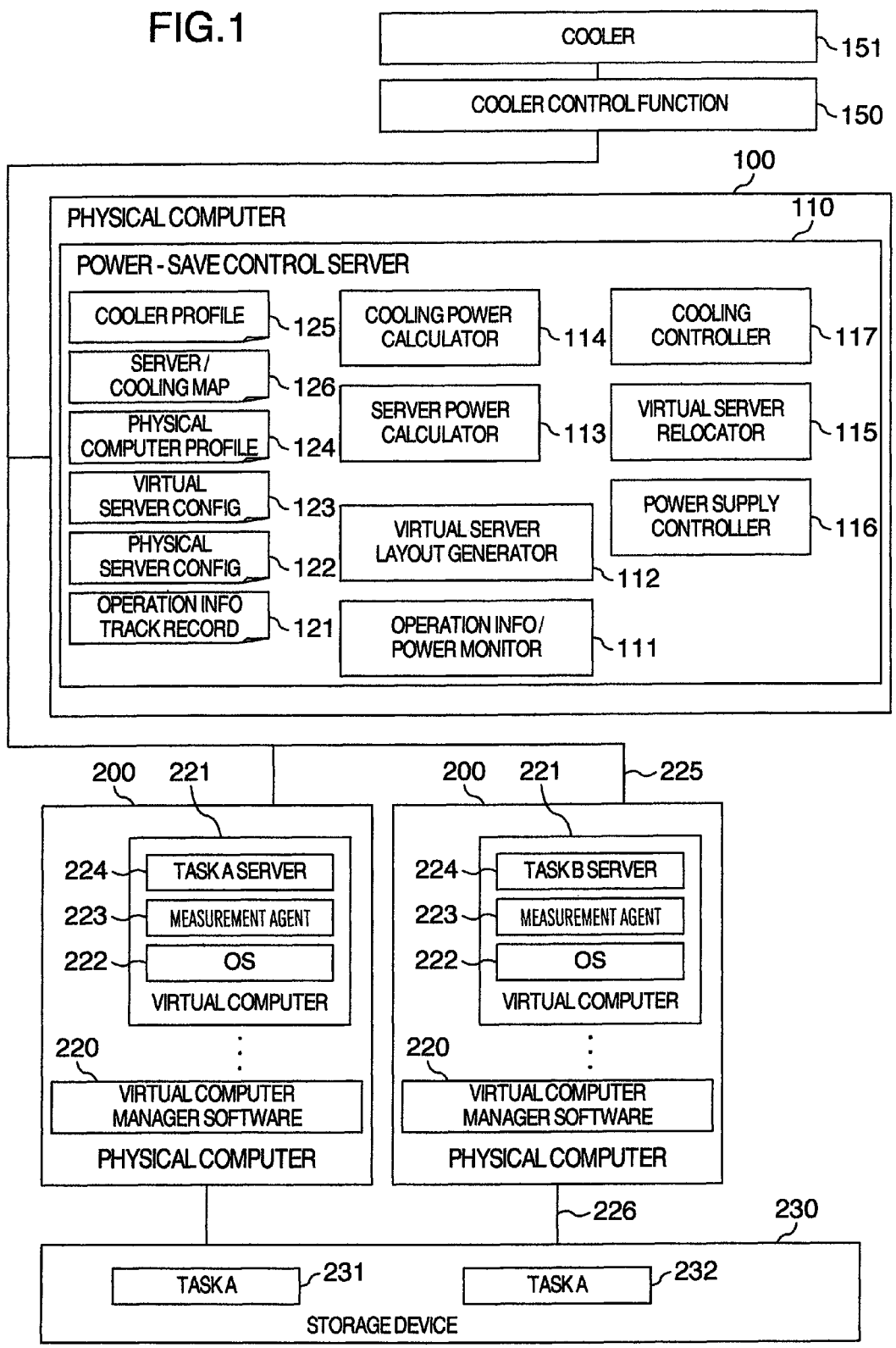
FIG. 1 is a diagram showing a system configuration in accordance with one embodiment of this invention.

One preferred form of this invention will be described with reference to the accompanying drawings below. FIG. 1 is a diagram showing an overall system configuration in accordance with one embodiment of the invention. This embodiment is an information processing system or a storage subsystem, which is arranged to include a power-saving control server 110, one or more physical computers 200, one or more than one external storage device 230, a cooling apparatus 151 which cools down a computer room with these information technology (IT) equipments being installed therein, and a cooling apparatus control function module 150 which controls the cooling apparatus 151. The power-save control server 110 is interconnected with the physical computers 200 and cooling apparatus 151 by way of a management network 225. The physical computers 200 are linked to the external storage devices 230 by a fiber or "fibre" channel network 226.

An explanation will first be given of the power-saving control server 110. This power-save control server 110 functions as a physical computer power-save controller with the physical computers 200 and external storage device 230 plus cooler control function 150 being as a managed object system, for providing access to the external storage device 230 under the cooling of the cooling apparatus 151, for sending and receiving information to and from a plurality of physical computers 200 to detect workload of these physical computers 200, and for individually controlling the cooling apparatus 151 via the cooler control function 151 in a way pursuant to the workload of the plurality of physical computers 200 to thereby control the cooling/refrigeration distribution thereof while at the same time controlling task allocation of the plurality of physical computers 200.

In this event, there is a case where the plurality of physical computers 200 are arranged as management object servers including a plurality of physical servers which give access to the external storage device 230 for processing information and a plurality of virtualized servers which are allocated to any one of the physical servers in accordance with the workload of the physical servers for executing a business task or tasks relating to the information. If this is the case, the power-save control server 110 performs several functional operations, including but not limited to, establishing a plurality of sets of task allocation patterns—say, task layouts—with respect to the management object servers from both the processing abilities of management object servers and the contents of a task to be processed on the management object servers, calculating an amount of electrical power to be consumed by the management object servers in each task layout based on electric power characteristics with respect to the processabilities of management object servers, calculating a heat generation amount of the management object servers in each task layout based on heat release characteristics with respect to the processabilities of management object servers, setting up the coolability of cooling apparatus 151 that cools the management object servers based on the heat release amount of the management object servers in each task layout, calculating power consumption of the cooling apparatus 151 based on power consumption characteristics with respect to the coolability of the cooling apparatus 151, and determining as a legitimate task layout for the management object servers a task layout of the plurality of task layouts which becomes minimum in a total of the consumed power of the management object server and the consumed power of the cooling apparatus 151.

More specifically, the power-save control server 110 is a software program which operates on the plurality of physical computers 200 and is generally made up of an operational information/power monitoring unit 111 which accepts input of physical server configuration information 122 and virtual server configuration information 123 indicating the configuration of a management object system and collects operational information and power consumption information of the physical computers 200 and virtual computers 221, a virtual server layout generation unit 112 which generates a layout of virtual servers for reduction of a total sum of power consumption values of the computers 200, a server power calculation unit 113 which reads a physical computer profile 124 to obtain server-consumed electrical power of a certain virtual server layout, a cooling power calculation unit 114 which accepts input of a cooling apparatus profile 125 and server/cooling map 126 to obtain electric power consumption needed for cool-down of a given virtual server layout, a virtual server relocation unit 115 which moves or transfers a virtual server based on the virtual server layout that was determined by the virtual server layout generator unit 112, a power supply control unit 116 which shuts shown the power supply of a physical computer 200 to which is not assigned any presently operating virtual servers, and a cooling control unit 117 which instructs control of the cooling apparatus 151.

Next, an explanation will be given of the management object system.

A virtual computer management software program 220 which realizes virtual computer-operating environments and one or more virtual computers 221 are operating on a physical computer 200. On each virtual computer, there are operating an operating system (OS) 222 and a measurement agent 223 which collects operational information of this virtual computer and also a business task/service server 224, such as a Web server. The virtual computer management software 220 has a function of performing adjustment of division and/or assignment to enable two or more OSs to use computer resources of the physical computer 200. By this virtual computer manager software, it is possible to achieve generation or "creation" of a new virtual computer and also definition and setup of virtual hardware owned by such virtual computer.

The measurement agent 223 is a software program which operates on a physical computer 200 to collect operational information of such apparatus on which the program per se is operating, such as CPU usage rate, memory use rate, network interface use rate, etc., and then records the collected information as a measurement counter. The operational information/power monitor unit 111 of the power-save control server 110 transmits to the measurement agent 223 an operational information collection request by means of a simple network management protocol (SNMP). The measurement agent 223 receives this operational information collection request and then sends to the operational information/power monitor 111 a measurement counter value which is designated by an object identification (ID) code in the request. Upon receipt of this measurement counter value, the power-save control server 110 records it as the operational information, thereby enabling execution of unified management of multiple items of operational information of a plurality of management objects.

FIG. 2 is a diagram showing a hardware configuration of the power-save control server 110 in one embodiment of this invention.

A physical computer 100 with the power-save control server 110 of this embodiment being rendered operative is arranged to have a central processing unit (CPU) 101, magnetic disk device 105, such as a hard disk drive (HDD) or else, a main memory 102, bus 107, network interface 104, and disk interface 103.

The magnetic disk drive 105 of the physical computer 100 on which the power-save control server 110 is rendered operative is arranged to store an operational information track record 121, virtual server configuration information 123, physical server configuration information 122, physical computer profile 124, cooling apparatus profile 125 and server/cooler map 126. Stored in the main memory 102 are software programs of power-save control server 110. These programs are stored in the magnetic disk drive 105 at the beginning and then transferred to the memory 102 when the need arises and, thereafter, executed by CPU 101.

FIG. 3 is a diagram showing a hardware structure of one of the physical computers 200 making up the management object system in one embodiment of this invention.

The physical computer 200 that makes up the management object system of this embodiment is arranged to have a CPU 201, magnetic disk device 205 such as HDD, main memory 202, bus 207, network interface 204, disk interface 203, and baseband management controller (BMC) 207 which performs status monitoring and power supply control.

The main memory 202 of the physical computer 200 constituting the management object system stores a virtual computer management program, virtual computer's OS, measurement agent program, and task service program. These programs are initially stored in the magnetic disk drive 205 and transferred to the memory 202 when the need arises and, thereafter, executed by CPU 201.

It should be noted here that these programs may be replaced by those which are read out of hand-carriable recording media and then stored in the magnetic disk drive 205 or, alternatively, stored therein after having downloaded from another computer or a recording device via a network connected to each device involved.

Also note that although each processing of the power-save control server 110 is executed in such a way that each program is executed by CPU, this is also realizable by hardware architecture using respective processing-execution modules, such as a measurement agent determination unit, measurement unit and others, which are integrated together on a substrate of ultralarge-scale integration (ULSI) circuitry by way of example.

Figure 4A:
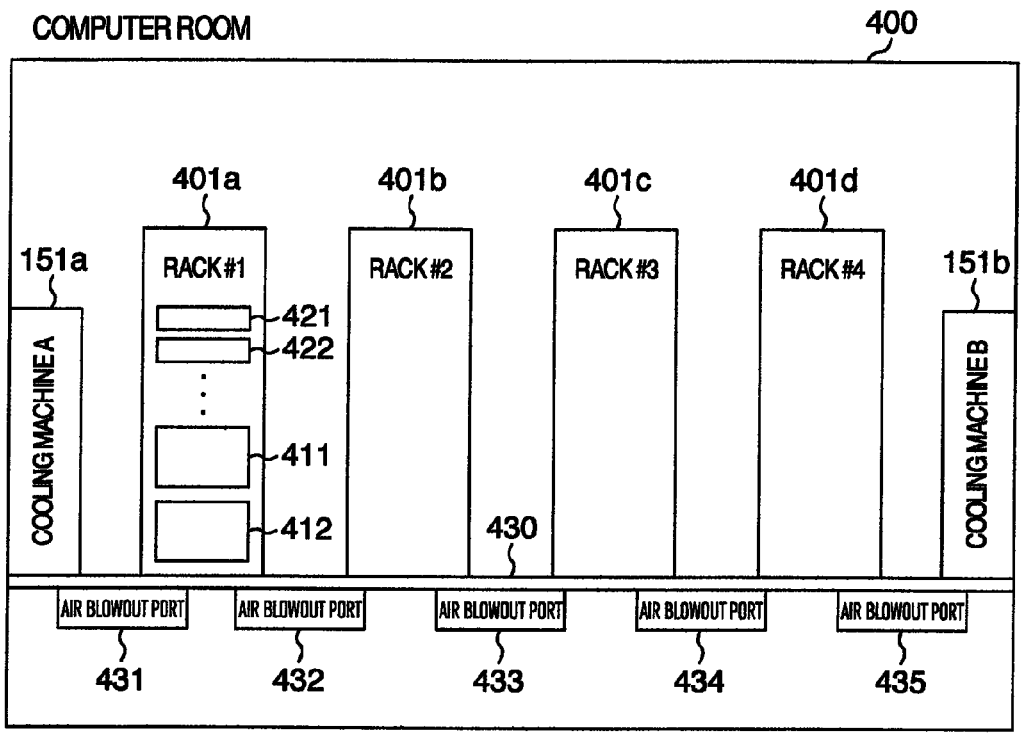
FIG. 4A is a diagram showing an internal arrangement of a computer room in one embodiment of this invention; and, FIG. 4B is a cross-sectional view of main part for showing the relationship of an air-blowing port and an electric motor as installed on the backface of a floor of the computer room.
Figure 4B:
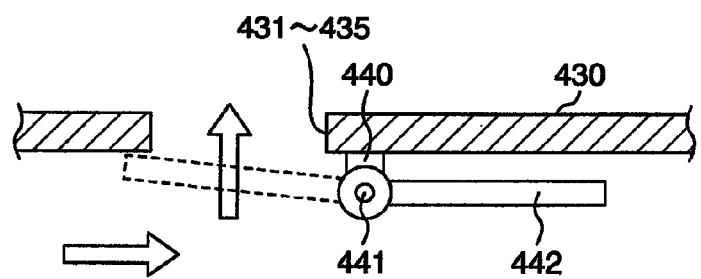

FIG. 4A is a diagram showing an equipment disposition layout of the computer room 400 in which the management object system is installed in accordance with one embodiment of this invention. FIG. 4B is a sectional diagram of part of the computer room.

As shown in FIG. 4A, the computer room 400 contains therein four racks 401a to 401d, server groups mounted on these racks respectively, and cooling facilities 151a and 151b for cooling these server groups. Respective server racks 401a-401d and cooling machines 151a-151b are rigidly placed on a floor 430. The floor 430 has a plurality of air blow-out holes or ports 431-435, which are formed therein. As better shown in FIG. 4B, an electric motor 440 is fixed to the floor's rear surface side at a position corresponding to each of the air blowout ports 431-435. This motor has a rotation shaft 441, which is coupled to an open/close plate 442 for opening and closing its corresponding one of the air blowout ports 431-435 in response to rotation drive of the motor 440. The server groups are connected to a management-use network 206 used for management of hardware devices and software programs and an office-use network 106 usable by an application program(s).

In the rack 401a, blade servers 411 and 412 are placed. Other blade servers (not depicted) are settled in the rack 401b. Placed in the rack 401c are two or more one-unit (1 U) servers No. 1 to No. 20 (not shown). Put in the rack 401d are 1 U servers #21 to #40 (not shown).

The cooling machines 151a and 151b are rigidly attached to side walls of the computer room 400 as constituent elements of the cooling apparatus 151 for retaining a temperature of computer room 400 at a constant level. These cooling machines 151a-151b are each arranged to send cold air to a space under the floor 430 and then force such cold wind to blow off from the air blowout ports (perforated tile plates) 431-435, thereby removing the heat generated by each server.

During the computer room air conditioning, control is provided to open an adequate one(s) of the air blowout ports 431-435 while causing the others to close. For example, when task allocation is set up only for those servers that are housed in the racks 401a and 401d while letting the servers placed in the remaining racks 401b-401c be out of the task allocation, control is executed as the control for the cooling apparatus 151 in such a way as to close one of the air blowout ports 431-435—here, port 433—and open the other air blowout ports 431-432 and 434-435 by means of rotation drive of the motor 440.

Alternatively, when the task allocation is set to only those servers housed in the racks 401*b*-401*c* while letting the servers put in the other racks 401*a* and 401*d* be out of the task allocation, control is performed as the control for cooling apparatus 151 to close ports 431 and 435 of the air blowout ports 431-435 and open the other air blowout ports 432-434 due to rotation drive of the motor 440.

Although in this embodiment each of the cooling machines is a computer room air conditioner (CRAC) of the standard type, this cooling machine may alternatively be a liquid-cooling apparatus which removes the heat exhausted from each server by causing a cooled liquid refrigerant to flow in a pipe for circulation through each rack. This liquid-cooling apparatus is typically associated with a valve which is at a location on the near side of a pipe extending to reach each rack, which valve is driven to open and close to thereby perform cooling output adjustment in a similar way to the air blowout ports stated above.

Additionally, the individual cooling machine may also be an outside air cooling apparatus which intakes cold ambient air and sends a cold wind by an underfloor air supply scheme which is similar to that of the above-stated CRAC apparatus, thereby to remove the heat generated by each server.

FIG. 5 is a diagram showing, in table form, the physical server configuration information 122 in one embodiment of this invention.

The physical server configuration information 122 consists essentially of one or more records, each having a physical computer ID 501 registered to a physical computer 200, chassis number 502, constituent element identifier (item) 503 and constituent element value 504, for indicating processing ability of the physical computer 200. In the physical computer ID 501, physical computer ID codes are stored—for example, the ID of a physical computer 200 to which is mapped a business task "A" is stored as a physical server 1, and the ID of a physical computer 200 to which is mapped a business task B is stored as a physical server 2. The chassis number 502 is to identify a chassis which houses blade servers in a case where the servers of interest are blade servers. If there is a server of the non-modular type, such as 1 U server or the like, "–" is entered to its corresponding cell in the table as shown in FIG. 5.

The physical server configuration information 122 is determinable at the time of system construction to be done by a designer of the management object system and is managed either by paper documents or by software programs in many cases. The physical configuration information may be prepared based on such the configuration information being managed in this way or, alternatively, may be prepared from dynamically collected information.

FIG. 6 is a diagram showing the virtual server configuration information 123 in one embodiment of this invention.

The virtual server configuration information 123 consists mainly of virtual computer allocation information 610 and virtual computer definition information 620. The virtual computer allocation information 610 is the one that represents the one-to-one correspondence between a physical computer 200 and a virtual computer 221 which works thereon and is made up of one or more records, each having a physical computer ID 611 that is an identifier of physical computer 200, type of a virtual computer management software program 220 that operates on the physical computer 200, one or more virtual computer IDs 613, and an IP address 614 of each virtual computer.

The virtual computer definition information 620 is the one that represents a resource assignment amount of a physical computer 200 with respect to virtual computer 221 and consists of at least one record having a virtual computer ID 621, type 622 of a task to be executed by the virtual computer, assignment ratio of a virtual CPU of the virtual computer 221, memory capacity usable by this virtual computer 221, band of disk interface (I/F), and band of network I/F.

It is noted that the creation of a virtual computer 221 and resource assignment to virtual computer 221 are achievable either by a system administrator's operation of an interface of the virtual computer management software 220 or by issuance of an application programming interface (API) of this virtual computer manager software from a program. Accordingly, these items of the virtual server configuration information 123 are preparable by referring to the information held by the virtual computer manager software.

FIGS. 7A and 7B are diagrams showing data structures of operational information 710 and electrical power information 720 in one embodiment of this invention. The operational information 710 is the one that indicates the resource usage status and electric power consumption situation of one physical computer 200 and consists essentially of one or more than one record having fields of a measurement date 711, measurement day of the week 712, measurement time 713, CPU operation rate 714, memory usage amount 716, disk I/F usage amount 717 and network I/F usage amount 718. In case the physical computer 200 has a plurality of CPUs and disk I/Fs plus network I/Fs, the operational information is acquired in units of such components. The operational information as shown herein is acquirable using Windows management interface (WMI) in case the OS used is Windows (registered trademark of Microsoft Corporation); in the case of Linux OS, the information is gettable using a "Top" command.

The electric power information 720 is the one that indicates a power consumption situation of physical computer 200. As shown in FIG. 7B, this information consists essentially of one or more records, each having fields of a measurement date 721, measurement day-of-the-week 722, measurement time 723, physical computer's power consumption 724 and chassis's power consumption 726. Note here that when the physical computer 200 that is a management object is a blade server, consumed power amounts of a plurality of physical servers and its associated chassis are managed together by a single table. Alternatively, in case the physical computer 200 is not the blade server, only one physical computer's power amount is managed.

FIG. 8 is a diagram showing a data structure of the physical computer profile 124 in one embodiment of this invention.

The physical computer profile 124 is divided into two parts: a server profile 810 and chassis profile 820. The server profile 810 is made up of one or more records each having, as fields, a physical computer working rate 801, heat generation amount 802, and power consumption 803. Each record represents a heat release amount and consumed power with respect to the working rate of a physical computer 200. Here, the physical computer working rate 811 is an operating rate of CPU.

The chassis profile 820 is structured from one or more records, each having fields of a physical computer working rate 821, heat release amount 822 and power consumption 823. The physical computer operational rate 821 in the chassis profile 820 is an operation ratio relative to a total sum of processing abilities of a plurality of physical computers 200 which are contained in the chassis of interest. Each profile record indicates a heat release amount and consumed power with respect to this operation ratio.

The physical computer profile 124 is different per model type of physical computer 200 and is collectable from a track record in the past. This profile may also be acquired with application of a load. It is also considered that a vendor of the physical computers 200 provides this profile.

FIG. 9 is a diagram showing a data structure of the server/cooling-machine map 126 in one embodiment of this invention.

The server/cooler map 126 is structured from one or more records each having fields of a rack identifier 901, an identifier 903 of cooling apparatus 151, and rack output distribution 904. Each record represents a rack, a cooling apparatus 151 that cools each rack, and a ratio of partial coolability of such cooling apparatus to its overall coolability, wherein the former is assigned to each rack.

FIG. 10 is a diagram showing a data structure of the cooling apparatus profile 125 in one embodiment of this invention.

The cooler profile 125 is constituted from one or more records each having fields of a cooler output 1001, cooling amount 1002, and power consumption 1003. Each record indicates a heat release amount and power consumption with respect to an output of the cooling apparatus 151 in a five-level divided manner. The cooler profile 125 is the information that is owned by the vendor as the processing performance and necessary electric power of the cooling apparatus 151—in near future, this kind of information is believed to be provided to users also.

Additionally, in the case of an outside air cooling architecture, the coolability with the same power consumption is variable with a change in outside air temperature. Accordingly, more than two cooler profiles 125 are supposed to exist in units of outside air temperature ranges.

The above-stated items of information shown in FIGS. 5 to 10 are described by the system administrator in a definition file, which is then input to the power-save control server 110. Note however that these information items may alternatively be input thereto from an appropriate graphical user interface (GUI) without having to use such definition file or, still alternatively, may be acquired from another server via a network.

A flow of electric power-saving control procedure will be described below.

Figure 11:
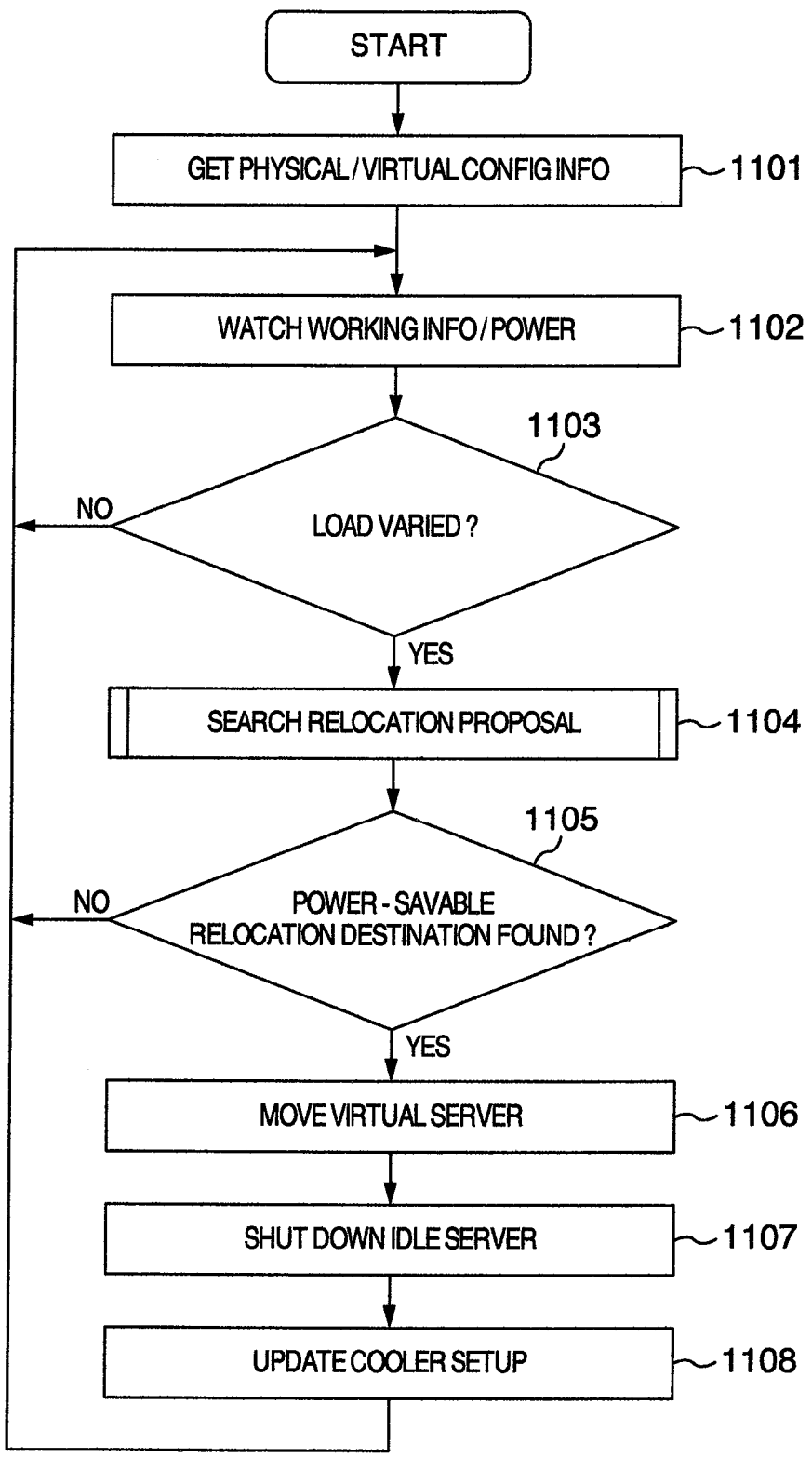
FIG. 11 is a flow diagram of a power-saving control operation in accordance with one embodiment of this invention.

FIG. 11 is a diagram showing a flowchart of the power-save control in one embodiment of this invention.

Firstly, the operational information/power monitor 111 of the power-save control server 110 reads the physical server configuration information 122 and virtual server configuration information 123 (at step S1011), recognizes physical computers 200 and virtual computers 221 which are the management objects, monitors operational information and power consumption of these physical and virtual computers (at step S1012), and then prepares a list of those of the physical computers 200 which exhibit load variations (at S1103). Whether load variation is present or absent is determinable by judging whether the state that the resource usage rate of a physical computer 200 is less than or equal to ten percent ($\leq 10\%$) is continued for more than ten minutes. If no such load variation occurs, the monitoring is being carried on.

The operational information/power monitor 111 refers to a task/service schedule and operational information 710 which is the past track record of the resource usage amount of the task of a virtual computer 221 that is operating on a physical computer 200 included in the above-stated list and judges whether a low load state of such physical computer 200 will be continued from now for a prespecified length of time period. Then, it conducts a search to determine whether there is a physical computer 200 which has an extra space large enough to enable transfer or "migration" of the virtual computer 221 on the physical computer 200 that has been judged so that its low load state will continue in the future. In case there is such physical computer 200 that has its vacancy large enough to become a transfer destination with respect to every virtual computer 221 operating on certain physical computer 200, the virtual server layout generator 112 prepares a relocation (task allocation) proposal of a case where any given virtual server working on the physical computer 200 included in the above-stated list is relocated to the above-stated physical server having the vacancy (at step S1104 of FIG. 11). In case there are more than two virtual computers 221 on a physical computer 200, these virtual servers may be transferred to the same physical computer 200 or, alternatively, may be moved to separate ones.

Next, the virtual server layout generator 112 obtains a power consumption value of the relocation proposal prepared and then compares it to a present power consumption value to thereby select a virtual server allocation with minimal power consumption (at step S1105).

When the power consumption of the relocation proposal is less in value than the present power consumption, the virtual server relocator 115 permits the virtual computer 221 to move in accordance with the relocation proposal (at step S1106). In this event the power supply controller 116 turns off the power supply of the physical computer 200 that has now become unused or "vacant" (step S1107). Further, when the cooling power calculator 114 judges that it is necessary to change the settings of the cooling apparatus 151, the cooling controller 117 issues a request for output change and sends it to the cooling apparatus control function 150 of the management object (at step S1108).

Finally, the procedure returns to the step S1102 which causes the power-save control server 110 to perform the monitoring of the operational information and electric power.

FIG. 12 is a flow diagram of the relocation proposal search procedure in one embodiment of this invention.

The virtual server layout generator 112 generates a layout pattern of virtual computer 221 onto physical computer 200 and then compares power consumption of one or more than one relocation proposal to that of the original virtual computer layout.

First, the virtual server layout generator 112 obtains a relocation proposal of virtual computer 221 with respect to physical computer 200 based on a resource amount needed by each virtual computer 221 and resource amount owned by each physical computer 200 (at step S1201).

The resource amount needed by virtual computer 221 is set to a maximal value of the resource usage amount of the task to be processed by this virtual computer. The maximum value and average value of the task's resource usage amount are obtainable from the track record 121 of the operational information.

A practically implemented relocation proposal preparation method is arranged to estimate a resource usage rate of a case where a virtual computer 221 operating on a physical computer 200 that is less in resource usage is moved to another physical computer 200 and select as a transfer destination a physical computer 200 which becomes the highest in usage rate while simultaneously ensuring that the physical computer 200 of transfer destination is still kept sufficient in its resource amount even after execution of the transfer. In case more than two virtual computers 221 are present on the transfer-destination physical computer 200, when there is found a transfer destination capable of permitting the transfer of all of these virtual computers 221, a layout of such moved virtual computers 221 is determined as the relocation proposal. At this time, the virtual server layout generator 112 refers to the virtual computer definition information 620 and acquires the kind of a business task or service to be executed by the virtual server and then excludes from target objects of the relocation those tasks which should not be transferred in any way. This is done because data packets being communicated between an external program and virtual server can often be lost at the time of transfer from a physical server that presently executes a virtual server toward another physical server. This packet loss does not cause any serious problems in many tasks because the use of a protocol with resend functionality, such as transmission control protocol (TCP) or else, guarantees that once-lost packets are sendable again for replenishment. However, in some kinds of tasks which are required to offer very high response performances, the performance required is hardly satisfiable with mere use of such resend functionality in some cases. In view of this fact, these "special" kinds of tasks are excluded from the objects to be transferred in the way stated supra. These tasks are determinable in advance; so, suppose that there is a list of these non-transferable tasks.

Another possible example of the relocation proposal obtaining method is to compute a layout with the minimum power consumption by combination optimization techniques without using the above-stated approach based on a present layout of virtual computers 221. Note however that in this case, the resulting layout can become larger in difference from a present virtual server layout, which leads to an unwanted increase in number of virtual server transfer sessions.

Next, an attempt is made to compute power consumption of the physical computer 200 of the relocation proposal. To do this, the virtual server layout generator 112 refers to the operational information track record 121 and obtains an average value of resource usage rates (amounts) of tasks to be processed by respective virtual computers 221 to thereby estimate the resource usage rate (amount) of each physical computer 200 by taking into consideration possible overhead of virtualization (at step S1202).

The virtualization overhead is different depending upon a virtualization mechanism used; so, the virtual server layout generator 112 refers to the virtual computer layout information 610 and acquires the type of a presently operating virtualizer mechanism in the physical computer 200 which is a task allocation object; simultaneously, it refers to an overhead value of this virtualizer mechanism to thereby estimate the resource usage rate (amount) of the physical computer 200. Suppose that the overhead value per virtualizer mechanism is held within the virtual server layout generator 112.

Then, the server power calculator 113 acquires based on the model type of physical computer 200 the physical computer profile 124 of such model type and obtains power consumption of the physical computer 200 with respect to the estimated resource usage rate (amount) of physical computer 200 (at step S1203). In case the referring of physical server configuration information 122 reveals that the physical computer 200 of interest is a blade server, what is obtained here is not power consumption of the physical computer 200 per se but power consumption of an entirety of the chassis.

There is also available a simplified means for estimating the power consumption of the physical computer 200 without having to use the physical computer profile 124, an example of which is to subtract from a present power consumption value a standby power value of physical computer 200 having its power supply which is deactivatable by the relocation to thereby obtain the power consumption of physical computer 200 after execution of the relocation.

Next, electric power needed for the cooling operation is calculated.

To do this, the virtual server layout generator 112 acquires based on the model type of the physical computer 200 the physical computer profile 124 of this model type and then obtains a heat generation amount with respect to the estimated CPU usage rate of physical computer 200 (at step S1204). Then, it refers to the server/cooler map 126 and determines the cooling apparatus 151 that is expected to perform the cooling of the rack under management; simultaneously, it obtains based on the cooler profile 125 of this cooling apparatus 151 an output and power consumption of the cooling apparatus 151 necessary for the cooling of the heat generation amount of those physical computers included in the rack to be managed (at step S1205). Note here that in the case of the outside air cooling, the cooling power calculator 114 acquires an outside air temperature by means of a temperature sensor that is put at a position outside the room and selects for later reference use the cooler profile 125 which is pursuant to a present outside air temperature.

Additionally, the cooling power calculator 114 refers to the server/cooler map 126 and modifies or "updates" the distribution of coolability when it is judged that the heat release amount of physical computer 200 after aggregation of virtual computers 221 exceeds the coolability in a present coolability distribution.

For example, in a case where the aggregation of all the virtual computers 221 to the physical computers 200 in the racks 401a and 401d results in heat release amounts of the physical computers 200 in racks 401a and 401d going beyond the coolability so that coolabilities of physical computers 200 in racks 401b and 401c become unnecessary, the presently established coolability distribution is modified in such a way as to assign the coolabilities of all cooling machines to the racks 401a and 401d. In case the coolability required is insufficient even after having modified the coolability distribution, a notice indicative of the lack of coolability is sent.

Although the physical computer profile 124 in this embodiment is exclusively related only to the CPU that is a major heat-generating component, the heat generation profile may alternatively be the information pursuant to usage rates of other components as well as the CPU.

Lastly, the virtual server layout generator 112 obtains power consumption of one or more physical computers 200 and also a total sum of power consumption values of the cooling machines 151 necessary for the cooling thereof (at step S1206).

As has been stated above, it becomes possible to select optimal virtual server locating (task allocation) which lessens or minimizes power consumption of the entire system by arranging the power-save control server 110 to include the virtual server layout generator 112 which sets up a plurality of sets of task layouts (virtual computer locating) with respect to physical computer 200, the server power calculator 113 which calculates power consumption of physical computer 200 in each task allocation, the physical computer profile 124 for estimation of a heat generation amount of physical computer 200 in each task allocation, the cooling power calculator 114 which calculates power consumption of cooling apparatus 151, and the virtual server relocator 115 which determines a task layout with a total of calculated values of the server power calculator 113 and cooling power calculator 114 becoming the minimum and determines it to be an optimal or "legitimate" task layout for the physical computer 200.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system comprising:
a plurality of managed servers for providing access to a storage device and for processing information;
a plurality of cooling machines for cooling said servers; and
a power-saving controller for sending and receiving information to and from said servers via a network to detect workload of said servers and for controlling said cooling machines and said servers in accordance with a detection result, wherein
said power-saving controller controls the cooling ability of said cooling machines in accordance with the workload of said servers and also controls task allocation with respect to said servers, wherein said power-saving controller includes:
a task allocation setting unit for setting up a plurality of sets of task allocations with respect to said servers from processing abilities of said servers and contents of one or more tasks to be processed on said servers;
a server power calculation unit for estimating electrical power consumption of said servers in each of the set-up task allocations based on electric power characteristics with respect to the processing abilities of said servers;
a heat generation amount calculation unit for estimating a heat generation amount of said servers in each of the setup task allocations based on heat generation characteristics with respect to the processing abilities of said servers;
a cooling power calculation unit for setting up a cooling ability of a cooling machine of said plurality of cooling machines which is chosen to cool said servers based on the heat generation amount of said servers in each of the setup task allocations and for estimating electric power consumption of said cooling machine based on power consumption characteristics with respect to the cooling ability of said cooling machine; and
a task allocation determination unit for determining in said plurality of sets of task allocations a task allocation which is reduced to a minimum in total of estimated values of said server power calculation unit and said cooling power calculation unit and for determining the task allocation to be a proper task allocation.

2. The information processing system according to claim 1, wherein said power-saving controller further includes:
a power supply control unit for deactivating a power supply of at least one server of said servers which is out of the proper task allocation due to the determination of said task allocation determination unit.

3. An information processing system comprising:
a plurality of managed servers for providing access to a storage device and for processing information;
a plurality of cooling machines for cooling said servers; and
a power-saving controller for sending and receiving information to and from said servers via a network to detect workload of said servers and for controlling said cooling machines and said servers in accordance with a detection result, wherein
said power-saving controller controls the cooling ability of said cooling machines in accordance with the workload of said servers and also controls task allocation with respect to said servers, wherein said power-saving controller includes:
an operation information track record unit for acquiring a track record of resource usage amounts of a task with respect to said servers; and
a power consumption calculation unit for calculating a recourse amount needed by the task and an average load of said servers based on said track record acquired by said operation information track record unit and for estimating power consumption of each said server based on the calculated values and load significance of each said server and power characteristics of said servers or a heat generation amount calculation unit for calculating a recourse amount needed by the task and an average load of said servers based on said track record acquired by said operation information track record unit and for estimating a heat generation amount of each said server based on the calculated values and load significance of each said server and heat generation characteristics of said servers, wherein
a calculation result of said power consumption calculation unit or said heat generation amount calculation unit is used as the workload of said servers.

4. An information processing system comprising:
a plurality of managed servers for providing access to a storage device and for processing information;
a plurality of cooling machines for cooling said servers; and
a power-saving controller for sending and receiving information to and from said servers via a network to detect workload of said servers and for controlling said cooling machines and said servers in accordance with a detection result, wherein
said power-saving controller controls the cooling ability of said cooling machines in accordance with the workload of said servers and also controls task allocation with respect to said servers, wherein said power-saving controller includes:
a cooling power calculation unit for calculating electrical power consumption of said cooling machines from a heat generation amount of said servers and power consumption characteristics of said cooling machines as obtained based on a correspondence relationship of processing abilities of said servers and cooling abilities of said cooling machines and for estimating the calculation result based on an outside air temperature in a case where said cooling machines are of an outside air cooling type, wherein
the calculation result of said cooling power calculation unit is used for cooling ability control with respect to each said cooling machine.

5. The information processing system according to claim 1, wherein said servers comprise a plurality of physical servers for processing the information and a plurality of virtual servers which are assigned to any one of said physical servers in accordance with workload of said physical servers for executing a task relating to said information.

6. An information processing system comprising:
a plurality of managed servers for providing access to a storage device and for processing information;
a plurality of cooling machines for cooling said servers; and
a power-saving controller for sending and receiving information to and from said servers via a network to detect workload of said servers and for controlling said cooling machines and said servers in accordance with a detection result, wherein
said power-saving controller controls the cooling ability of said cooling machines in accordance with the workload of said servers and also controls task allocation with respect to said servers, wherein said power-saving controller includes:

a task allocation setting unit for setting up a plurality of sets of task allocations with respect to said servers from processing abilities of said servers and contents of one or more tasks to be processed on said servers;

a server power calculation unit for estimating electrical power consumption of said servers in each of the set-up task allocations based on electric power characteristics with respect to the processing abilities of said servers;

a power consumption calculation unit for calculating present power consumption of said servers in each of the setup task allocations; and a task allocation determination unit for determining each of the setup task allocations to be a proper task allocation in a case where the power consumption estimated by said server power calculation unit is less than the power consumption calculated by said power consumption calculation unit and for redoing each said task allocation in other cases.

7. A power-saving control method for use in an information processing system having a plurality of managed servers for giving access to a storage device to thereby process information, a plurality of cooling machines for cooling said servers, a power-saving controller for sending and receiving information to and from said servers via a network to detect workload of said servers and for controlling said cooling machines and said servers in accordance with a detection result, said method causing said power-saving controller to execute the steps of:

controlling a cooling ability of said cooling machines in accordance with the workload of said servers; and controlling task allocation with respect to said servers, wherein said power-saving controller executes the steps of:

setting up a plurality of sets of task allocations with respect to said servers from processing abilities of said servers and contents of one or more tasks to be processed on said servers;

estimating electrical power consumption of said servers in each of the set-up task allocations based on electric power characteristics with respect to the processing abilities of said servers;

estimating a heat generation amount of said servers in each of the setup task allocations based on heat generation characteristics with respect to the processing abilities of said servers;

setting up a cooling ability of a cooling machine of said plurality of cooling machines which is chosen to cool said servers based on the heat generation amount of said servers in each of the setup task allocations while simultaneously estimating electric power consumption of said cooling machine based on power consumption characteristics with respect to the cooling ability of said cooling machine; and determining a task allocation of said plurality of sets of task allocations which is reduced to a minimum in total of an estimated power consumption of said servers and an estimated power consumption of said cooling machines to be a proper task allocation with respect to said servers.

8. The power-saving control method according to claim 7, wherein said power-saving controller further executes the steps of:

deactivating a power supply of at least one server of said servers which is out of the proper task allocation.

* * * * *